J. S. BAKER.
COOKING APPARATUS.
APPLICATION FILED SEPT. 2, 1916.
1,315,075.
Patented Sept. 2, 1919.
4 SHEETS—SHEET 1.
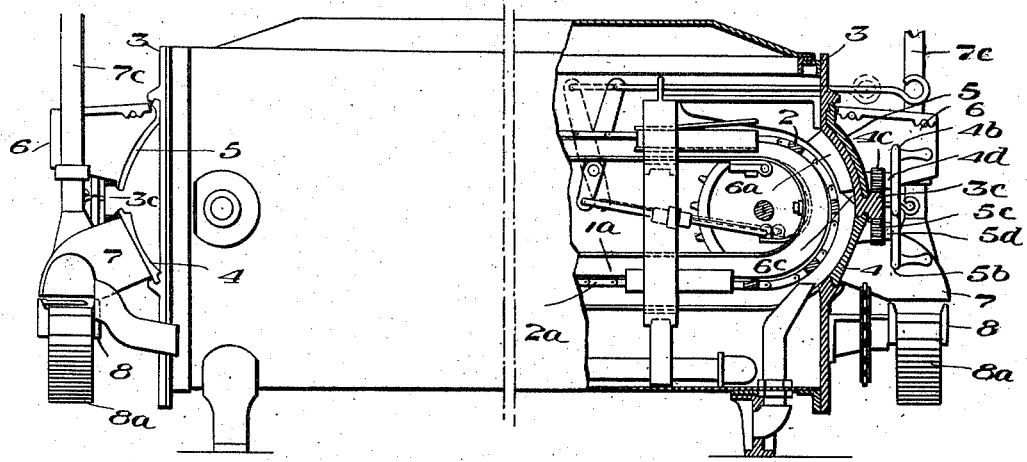
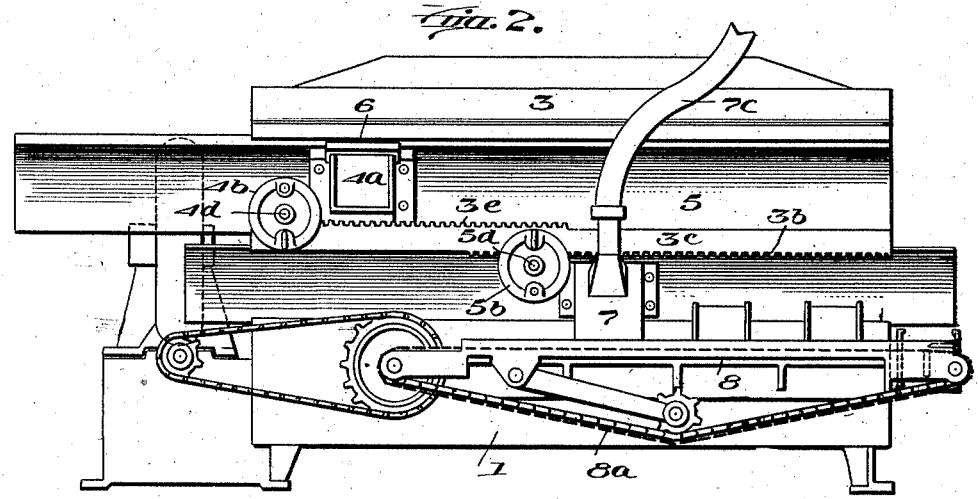

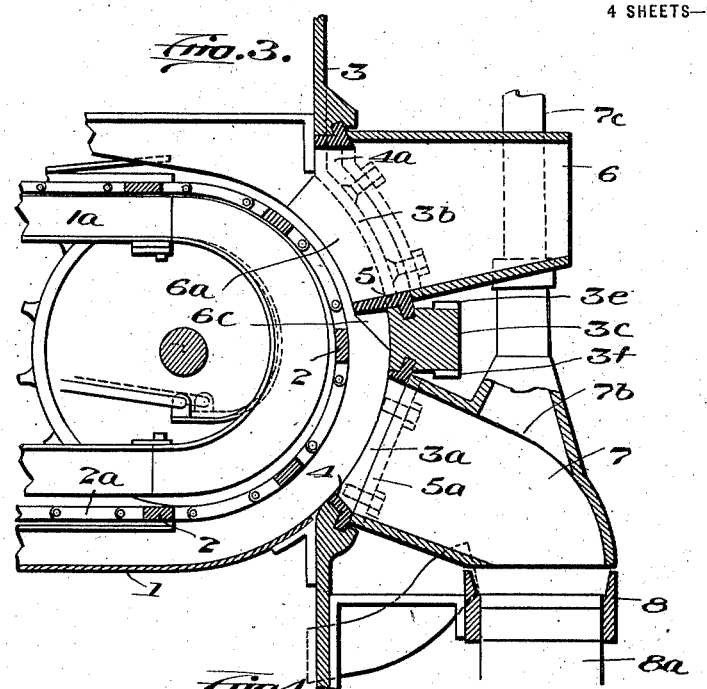

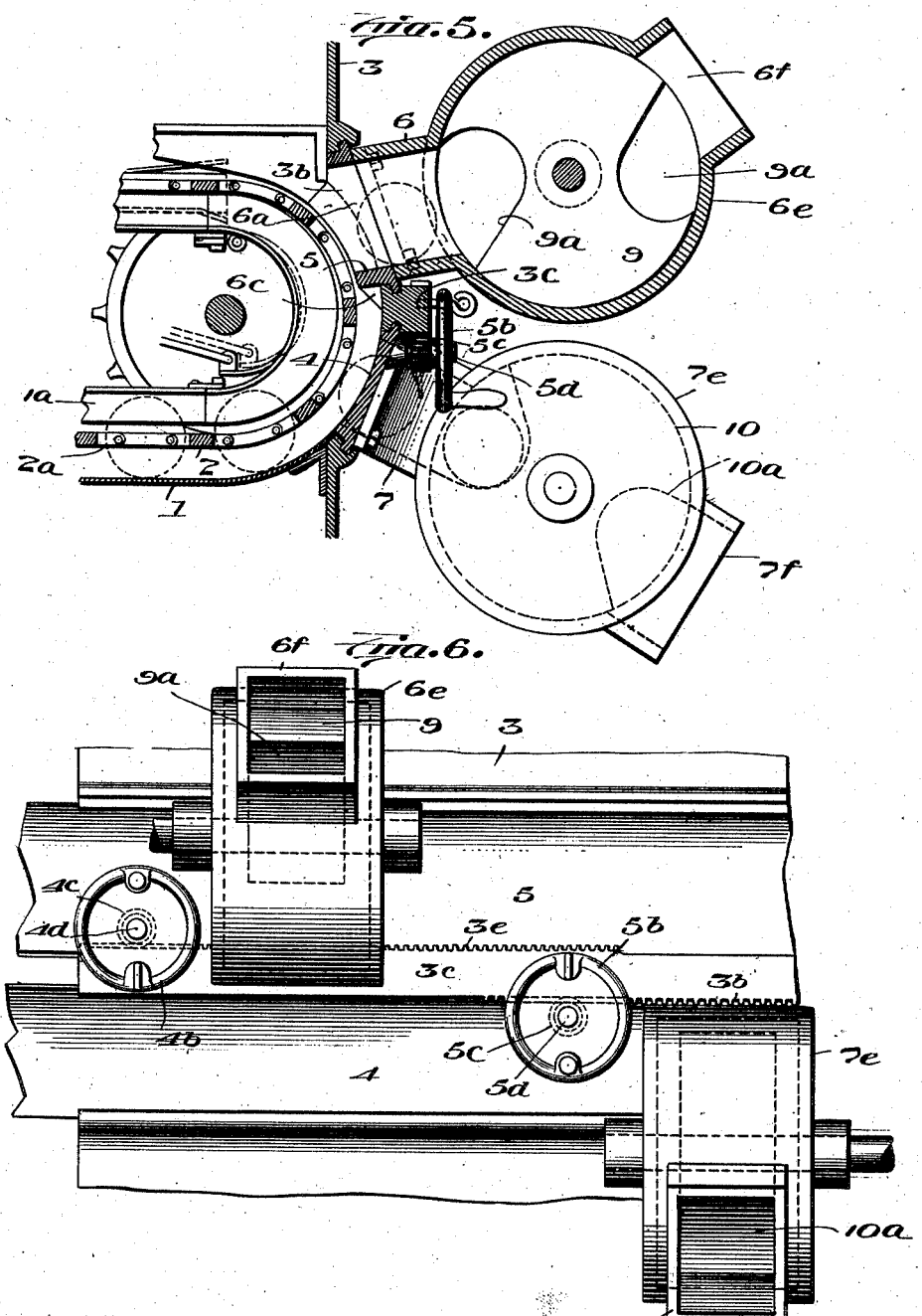

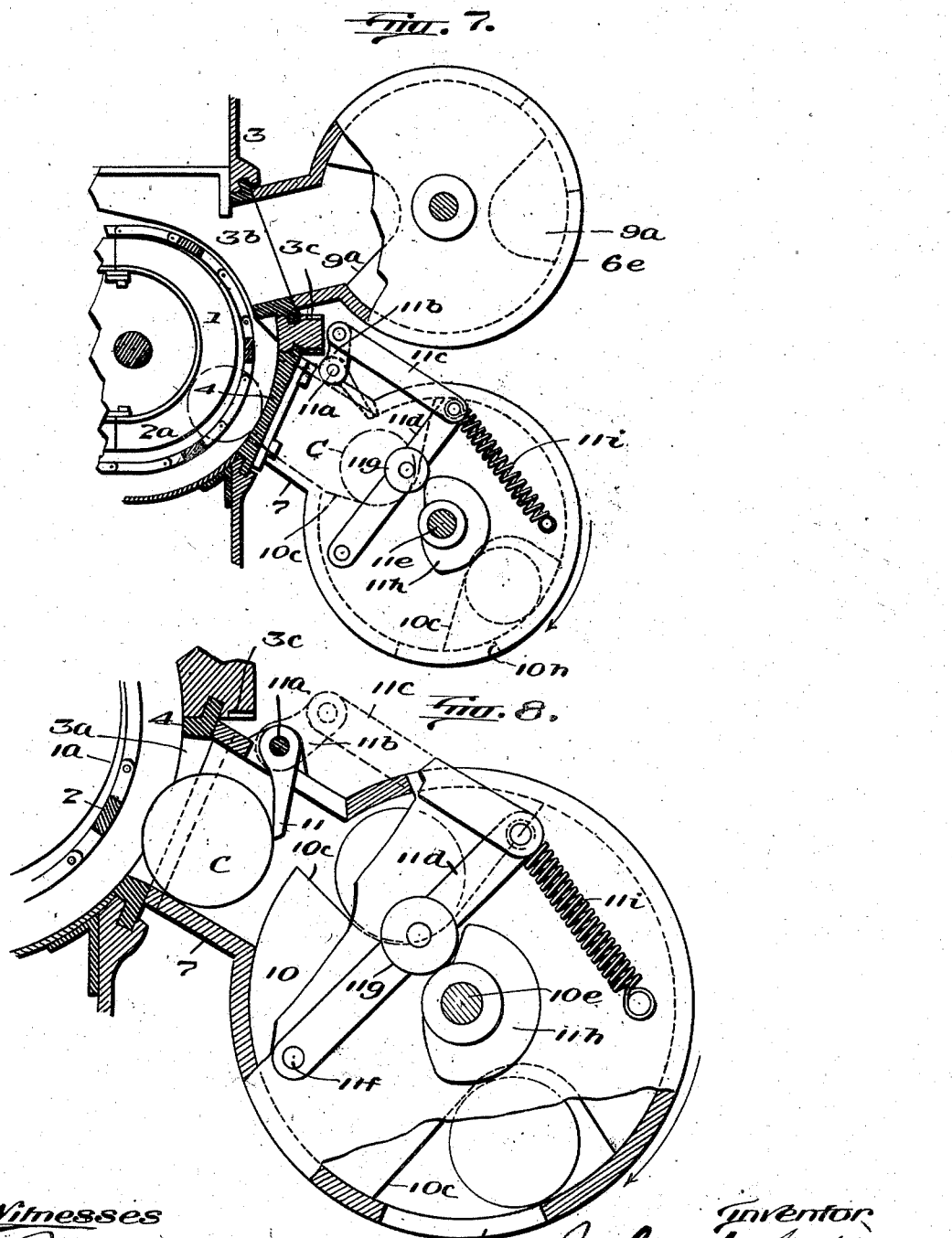

UNITED STATES PATENT OFFICE.

JOHN S. BAKER, OF LOS ANGELES, CALIFORNIA, ASSIGNOR, BY MESNE ASSIGNMENTS, TO ANDERSON-BARNGROVER MFG. CO., OF SAN JOSE, CALIFORNIA, A CORPORATION OF CALIFORNIA.

COOKING APPARATUS.

1,315,075.  Specification of Letters Patent.  Patented Sept. 2, 1919.

Application filed September 2, 1916. Serial No. 118,266.

*To all whom it may concern:*

Be it known that I, JOHN S. BAKER, a citizen of the United States, residing at Los Angeles, in the county of Los Angeles and State of California, have invented certain new and useful Improvements in Cooking Apparatus; and I hereby declare that the following is a full, clear, and exact description thereof, reference being had to the accompanying drawings, which form part of this specification.

This invention is a novel improvement in machines for treating packaged goods or so called can cooking machines of the general type shown in my Patent No. 1,182,832 of May 9, 1916; and the object of this invention is to provide a machine capable of great flexibility of operation and in which the feed can be readily adjusted or shifted so as to feed cans into any desired run of the canway or at any one of a number of points in the canway; and also if desired to provide this machine with a discharge which can be adjusted to discharge cans from any desired run of the canway. In this way a great variety of lengths of cooks or treatment of the packages or cans in the machine can be obtained; and if desired the feeding and delivery devices can be provided with rotary valves so that the machine can be practically used as a high temperature machine with speed.

An essentially novel feature of the machine is having the feeding devices adjustable transversely of the series of runs in the canway so that the same feeding device can be used to deliver cans to different runs of the canway, and also if desired each end of the machine may be equipped with adjustable feeding and delivery devices so that a plurality of series of cans can be simultaneously passed through the machine and each series of packages or cans given a different length of treatment or cook, according to the nature of the goods being operated upon.

I will explain the invention with reference to the accompanying drawings which illustrate a practical embodiment thereof and which will in connection with the description enable others skilled in the art to adopt and use the same; but I do not consider the invention restricted to the particular form or construction of parts shown as when once understood the adaptability of the invention to different varieties and structures of the machine can be readily appreciated by those skilled in the art. The essential feature of construction and combinations of parts for which protection is desired are summarized in the claims following the description.

In said drawings:

Figure 1 is a sectional side elevation of a machine substantially such as shown in my aforesaid patent with the present improvements applied thereto.

Fig. 2 is an enlarged detail elevation of one end of such machine.

Fig. 3 is a longitudinal sectional elevation of one end of such machine.

Fig. 4 is an enlarged detail end elevation thereof.

Fig. 5 is a longitudinal sectional view of one end of such machine showing the rotary valves used in connection with the feeding and delivery slides.

Fig. 6 is an enlarged detail end view of Fig. 5.

Figs. 7 and 8 are detail sectional views showing means for controlling the entry of cans from the canway into the discharge valve.

Referring to said drawings, 1 designates a tank or cooking chamber which may be of any suitable construction, substantially such for example as described in my aforesaid patent. Within this tank is a preferably endless spiral canway $1^a$ around which the cans may be traversed in a spiral path; this canway may be constructed substantially as described in my said patent or in my Patent No. 1,181,057 of April 25, 1916, and needs no detailed description herein.

The cans may be propelled around this canway along the spiral canway by means of pusher bars 2 connected to endless chains $2^a$ operated as described in my aforesaid patents. On each end of the tank may be formed a casting 3 which may be provided with a lower opening $3^a$ and upper opening $3^b$; this casting may be curved so that its innerface will practically form part of the outer wall of the canway to guide cans around the bend of the canway as in my said Patent No. 1,182,832. The opening $3^a$ is closed by a slide 4 and the opening $3^b$ by a slide 5. These slides 4 and 5 are respectively guided in grooves formed in the casting 3 at the upper and lower edges of the openings therein as shown, see Fig. 2; and intermediate the openings may be formed a guard to the casting 3 and projecting transfer bar or bracket $3^c$ which may be provided with racks $3^e$ and $3^f$ on its upper and lower sides respectively.

The slide 5 is provided with a feed opening $4^a$ and to this slide is bolted a feed chute 6 which is adapted to receive the cans or packages to be fed into the machine from any suitable feeding devices, not shown, which may be such as are used in canneries.

The delivery slide 4 is provided with a discharge opening $5^a$ to which may be attached a discharge chute 7 to direct cans from the opening in any desired manner. The slide 5 with the opening $4^a$ is adjustable transversely of the tank or canway preferably by means of a hand wheel $4^b$ carrying a pinion $4^c$ which meshes with rack $3^e$, said hand wheel and pinion being rotatably mounted on a stud $4^d$ attached to the slide 5 so that when the hand wheel $4^b$ is turned the slide 5 can be adjusted transversely of the machine.

Similarly slide 4 may be adjusted by means of a hand wheel $5^b$ carrying a pinion $5^c$ meshing with a rack $3^f$, and the hand wheel and pinion being mounted on a stud $5^d$ attached to slide 4. The pinions $4^c$ and $5^c$ are preferably of such diameter that for a complete rotation either pinion will move the related slide the width of one run of the canway and as these slides are adjustable transversely of the tank and canway the operator can very readily adjust the feed so as to deliver cans into any desired run of the canway, or he can adjust the discharge so as to let cans escape from any desired run of the canway; there is only one discharge opening and one feed opening on each slide; while more might be used I do not consider this desirable. However to enable a plurality of cans to be simultaneously fed to and delivered from this machine in series the feeding and delivery slides 4 and 5 can be duplicated at each end of the machine as indicated in Fig. 1 so that cans can be fed and discharged through both ends of the machine if it is desired.

In the example shown in Figs. 1, 3 and 5 the feed chute 6 projects sufficiently into the machine beyond the inner edge of the casting 3 as indicated at $6^a$ to deliver the cans properly into the run of the canway; and preferably a filler or guard $6^c$ is provided beneath the lower inner edge of the chute so that in case one of the pusher bars 2 should be bent and project outwardly sufficiently to otherwise engage the projecting inner end of the feed chute it would engage this deflector or guard $6^c$ and be directed inwardly thereby past the inner end of the chute without injury and without breaking the pusher bar or the chute.

The discharge hood 7 is indicated in detail in Fig. 3 and is adapted to deliver cans into a trough 8 from whence they may be removed by a chain $8^a$ which would be operated by suitable means, forming no part of the present invention, so as to carry off the cans. If desired the hood 7 might be provided with a vent opening $7^b$ in its upper side which can be connected with pipe $7^c$ to carry off vapors which might enter the hood.

In some cases it might be desired to use high pressure or steam in the cooker in which case it would be desirable to use valves to close the inlet and discharge chutes 6 and 7 and for this purpose a rotary valve casing $6^e$ could be attached to the chute 6, see Figs. 5 and 6, and within this be mounted a rotary valve 9 provided with pockets $9^a$ and the cans can be fed into these pockets from any suitable feeder, and also the valve may be rotated by any suitable means and in a manner so as to take the cans successively from the inlet at $6^f$ and deliver them to the chute 6. Similarly the discharge chute 7 may be provided with a casing $7^e$ in which is a rotary valve 10 having pockets $10^a$ adapted to receive cans successively from the chute 7 and discharge them at the outlet $7^f$ into any suitable receiver. The valves 9 and 10 are to be simultaneously operated and any suitable means may be employed for operating these valves, but they must be operated in unison with each other and also in uniformity with the pusher bars 2 as the same travel past the feed chute 6 and the discharge chute 7. With this construction however it will be observed that considerable pressure might be employed in the cooking chamber or tank so as to subject the goods therein to unusually high heat or greater heat than would be possible with the feed and discharge passages shown in Fig. 1.

By this construction very great flexibility of the machine is obtained and great simplicity afforded, for it will be observed that in the machine shown in the drawings the cans or packages can be fed for example at the right hand end of the machine and be caused to traverse any desired number of coils or spirals of the canway, as it is only necessary to adjust the feed slide 5 transversely of the machine to vary the point of feed and the packages or cans will travel therefrom through the machine until they reach the discharge port $5^a$ of the slide 4, which slide 4 can also be adjusted transversely of the machine so that the cans or packages may be delivered or discharged from the canway at any desired point. If it is desired that the cans or packages shall traverse the entire lengths of the spirals of the canway the slide 5 is adjusted toward the left hand side of the machine for positioning its opening 4$^a$ to feed cans to the first run of the canway, while slide 4 is adjusted so as to position its discharge opening 5$^a$ at the right hand side of the machine for delivering the packages or cans from the last run of the spirals of the canway. If it is desired to shorten the lengths of the treatment of the packages or cans either the slide 5 is adjusted toward the right hand side of the machine or the slide 4 may be adjusted toward the left hand side of the machine in which case the cans or packages may be passed through the left hand portion or the right hand portion of the machine as desired in accordance with the temperature of the chamber at the respective points. If, however, it is desirable that the cans or packages should traverse any of the intermediate runs of the canway the slides 5 and 4 may be simultaneously adjusted toward each other in a manner to cause the cans to traverse more or less of the runs of the canways substantially at the longitudinal center of the machine.

Should it be desired to treat series of pluralities of cans or packages the machine may be provided at its opposite or rear end with a duplication of the parts just described and as indicated in Fig. 1, whereby the feed and delivery slides 5 and 4 will be adjusted in the manner above set forth for varying the length of treatment of the cans at the front end of the machine, and if desired the feed chute 6 and the delivery chute or hood 7 at the rear end of the machine may also be provided respectively with the rotary valves 9 and 10 as indicated at the front end of the machine in Fig. 5 of the drawings.

When the rotary valves are used as indicated in Figs. 5 to 8, it is desirable to control the entry of cans from the canway into the discharge valve so as to prevent cans from entering the pocket of the valve out of time and to insure that the cans shall not be caught between the edge of the valve pocket and the valve casing, as might sometimes happen and result in crushing or injuring the cans. The rotary valve 10 does not necessarily operate in exact unison with the pusher bars 2, although it is operated in such time that the valve will discharge the cans as rapidly as they are brought forward by the pusher bars. As shown in Figs. 7 and 8, a detent 11, mounted on a rock shaft 11$^a$, projects into the throat of the chute or head 7 and in its normal position (in Fig. 8) the detent 11 depends into the pathway of the cans C and will arrest such can before it can contact with the rotary valve 10. On the shaft 11$^a$ is a crank 11$^b$ which is connected by link 11$^c$ to one end of a lever 11$^d$, pivoted at 11$^f$ on the side of the valve casing. This lever is preferably provided with an antifriction roller 11$^g$ which is adapted to engage a cam 11$^h$ with the shaft 10$^e$ on the valve 10. The lever 11$^d$ may be normally retracted, or moved to hold the roller 11$^g$ in contact with the cam 11$^h$, by means of a spring 11$^i$.

The operation is such that the detent 11 is held in the position indicated in Fig. 8 until the pocket 10$^c$ in the valve 10 practically registers with the chute 7 as indicated in Fig. 7, whereupon the detent is raised and the can rolls down into the pocket. Then the lever 11$^d$ under the action of spring 11$^i$, is permitted by the cam 11$^h$ to assume the position shown in Fig. 8, so that such detent will arrest the incoming can in the position indicated in Fig. 8 until the next pocket has registered with the chute 7, whereupon the detent is raised to the position indicated in dotted lines in Fig. 7 and the can permitted to roll into the pocket and the detent returns to the position indicated in Fig. 8 to arrest the next can until a pocket has properly registered with the chute. The valve casing 10 is provided with an outlet 10$^h$ through which the cans are successively discharged from the pockets. If desired a similar can detent might be employed in connection with the rotary inlet valve.

What I claim is:

1. In a can cooking apparatus, the combination of a casing providing a cooking chamber, a spiral canway therein, inlet and outlet controlling members each having a port, and means for adjusting the members so as to bring their respective ports into register with any run or runs of the canway to and from which it is desired to feed and discharge cans.

2. In a can cooking apparatus, the combination of a casing providing a cooking chamber, a spiral canway therein, adjustable inlet and outlet slides adjacent the canway each having a port therein which may be brought into register with any desired run or runs of the canway to regulate the length of treatment of the cans through the canway.

3. In an apparatus of the character specified, the combination of a chamber, means for moving containers therethrough, a longitudinally movable inlet slide having a port, and means for positioning the slide to direct the containers through said port to any desired part of the moving means in the chamber.

4. In a cooking apparatus, the combination of a chamber, means for moving containers therethrough, an inlet opening for said chamber, a slide closing the inlet opening and having a port for feeding containers to said moving means, said slide being movable transversely of the chamber, a discharge opening for said chamber, and a slide closing the discharge opening and having a port to deliver the containers from said moving means at any desired point.

5. In combination, a cooking chamber having a feed opening and a discharge opening, a member covering each of said openings and provided with a port, and means for positioning each member to bring its port in register with different parts of the related chamber opening.

6. In a cooking apparatus, the combination of a chamber having a large feed opening, a canway in said chamber, a large discharge opening at the end of the canway, slides respectively fitted over said openings each slide having a port, and means for adjusting each slide to bring its port into register with different runs of the canway.

7. In an apparatus of the character specified, the combination of a cooking chamber having a plurality of openings, means for moving packages therethrough, independently adjustable slides respectively covering said openings and each having a port, and means for independently adjusting the slides so as to permit feed and delivery of packages through said ports to and from the chamber at any desired points.

8. In a cooking apparatus, the combination of a chamber having large openings for inlet and outlet of packages, means for moving packages therethrough, a slide covering the inlet opening and having a port for the inlet of packages, said slide being adjustable to permit the feed of cans through said opening at any desired point; and a second slide covering the outlet opening and provided with a port, said slide being adjustable so as to permit the escape of cans at any desired point.

9. In a cooking apparatus the combination of a chamber having an opening, a canway in said chamber, and a slide closing said opening having a port, means for adjusting said slide to bring the port into register with different runs of the canway, and a valve controlling said port.

10. In an apparatus of the character specified, the combination of a chamber having an opening, an adjustable plate covering said opening provided with a port, a chute connected with the plate and covering the port, a rotary valve in said chute and means for preventing the passage of a can into the valve until the latter is properly positioned.

11. In an apparatus of the character specified, the combination of a chamber having an opening, an adjustable plate covering said opening provided with a port, a chute connected with the plate and covering the port, and a rotary valve in said chute, said valve having pockets; with a detent for preventing the entry of a can into a valve pocket until the latter is properly positioned.

12. In an apparatus of the character specified, the combination of a chamber having an opening, an adjustable plate covering said opening provided with a port, a chute connected with the plate and covering the port, and a rotary valve controlling said chute, said valve having pockets; with a detent for preventing the entry of a can into a valve pocket until the latter is properly positioned, a cam controlled lever and connections for moving the detent into one position, and a spring for throwing the detent into the opposite position.

In testimony that I claim the foregoing as my own, I affix my signature.

JOHN S. BAKER.